US012535975B2

(12) United States Patent
Tanaka et al.

(10) Patent No.: US 12,535,975 B2
(45) Date of Patent: Jan. 27, 2026

(54) CONTROL APPARATUS, NON-TRANSITORY COMPUTER READABLE MEDIUM, AND PRINTER

(71) Applicant: FUJIFILM Business Innovation Corp., Tokyo (JP)

(72) Inventors: Kazunari Tanaka, Kanagawa (JP); Sho Nagase, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 334 days.

(21) Appl. No.: 18/181,646

(22) Filed: Mar. 10, 2023

(65) Prior Publication Data

US 2024/0078063 A1 Mar. 7, 2024

(30) Foreign Application Priority Data

Sep. 5, 2022 (JP) ................................ 2022-140768

(51) Int. Cl.
*G06F 3/12* (2006.01)
*H04N 1/327* (2006.01)

(52) U.S. Cl.
CPC .......... *G06F 3/1222* (2013.01); *G06F 3/1204* (2013.01); *G06F 3/1238* (2013.01); *H04N 1/32732* (2013.01)

(58) Field of Classification Search
None
See application file for complete search history.

(56) References Cited

U.S. PATENT DOCUMENTS

| 11,176,260 | B2 * | 11/2021 | Rothenbuhler | ....... G06F 3/1292 |
| 2010/0214585 | A1 | 8/2010 | Tanji | |
| 2013/0201518 | A1 * | 8/2013 | Pan | ....... G06F 3/1288 |
| | | | | 358/1.15 |
| 2016/0028912 | A1 * | 1/2016 | Harada | ....... H04N 1/00933 |
| | | | | 358/1.15 |
| 2016/0350042 | A1 * | 12/2016 | Suwabe | ....... H04N 1/4406 |
| 2020/0019352 | A1 * | 1/2020 | Agrawal | ....... G06F 3/1204 |

FOREIGN PATENT DOCUMENTS

| JP | H04-37942 B2 | 6/1992 |
| JP | H04-54823 B2 | 9/1992 |
| JP | H0522514 B2 | 3/1993 |
| JP | H05-32729 B2 | 5/1993 |
| JP | 5225143 B2 | 7/2013 |
| JP | 5327295 B2 | 10/2013 |

* cited by examiner

*Primary Examiner* — Haris Sabah
(74) *Attorney, Agent, or Firm* — Oliff PLC

(57) ABSTRACT

A control apparatus includes a processor configured to: execute a first control if printing time is equal to or greater than predetermined reference time, the printing time being for a case of using a printer to print on basis of print instruction received from user terminal, the first control causing the printer to start printing before user reaches the printer, and causing printed material to be delivered into a locked delivery unit that requires a key for retrieval of printed material; and execute a second control if printing time is less than reference time, the second control causing the printer to start printing after the user reaches the printer, without involving an operation of giving a print instruction performed by the user on the printer, and causing the printed material to be delivered into a normal delivery unit that does not require a key for retrieval of the printed material.

12 Claims, 5 Drawing Sheets

CONTROL APPARATUS, NON-TRANSITORY COMPUTER READABLE MEDIUM, AND PRINTER

CROSS-REFERENCE TO RELATED APPLICATIONS

This application is based on and claims priority under 35 USC 119 from Japanese Patent Application No. 2022-140768 filed Sep. 5, 2022.

BACKGROUND

(i) Technical Field

The present disclosure relates to a control apparatus, a non-transitory computer readable medium, and a printer.

(ii) Related Art

Japanese Patent No. 5327295 discloses a printing apparatus including: a reception unit that receives print data; a forwarding determination unit that determines whether the received print data has been forwarded from another printing apparatus; a locked output bin which is unlockable with a key and into which the print data may be outputted in a state of being printed onto paper; a state determination unit that determines whether the locked output bin is in a usable state; and a control unit that performs an output destination designation process in which, if the forwarding determination unit determines that the print data has not been forwarded from another printing apparatus, the output destination of the received print data is designated, according to information related to the print data, to be any of the locked output bin and a holding unit in which the print data may be held and from which the held print data is retrievable for printing on the basis of user authentication, wherein: if the output destination of the print data is designated to be the locked output bin and the state determination unit determines that the locked output bin is in an unusable state, the control unit forwards the print data to another printing apparatus having a usable locked output bin; if the forwarding determination unit determines that the print data has been forwarded from another printing apparatus, the control unit designates the output destination of the print data to be the locked output bin without performing the output destination designation process; the print data is print data for confidential printing; and the control unit designates the output destination of the print data according to information related to the print data that has been corrected on the basis of the level of confidentiality of the print data.

Japanese Patent No. 5225143 discloses an image processing apparatus configured to deliver printed paper into a locked delivery means, the image processing apparatus being provided with: an authentication means that authenticates a user; a key control means that unlocks the locked delivery means in accordance with an authentication result from the authentication means; a holding means that holds state information indicating whether each of multiple users for whom paper has been delivered into the locked delivery means is authenticated by the authentication means; a determination means that determines whether a user not authenticated by the authentication exists on the basis of the state information held in the holding means; a detection means that detects the presence or absence of paper delivered into the locked delivery means; and a notification means that gives notice of incorrect retrieval of paper if the detection means detects that there is no paper in the locked delivery means and the determination means determines that a user not authenticated by the authentication means exists.

SUMMARY

A control apparatus is conceivable with respect to a printer that starts printing without involving an operation of giving a print instruction performed by a user on the printer, in which the control apparatus causes the printer to start printing before the user reaches the printer, and causes printed material to be delivered into a locked delivery unit that requires a key for retrieval of the printed material.

Since such a control apparatus causes the printer to start printing before the user reaches the printer, the wait time until the printing is completed may be shortened, but on the other hand, since the locked delivery unit is required to be unlocked to retrieve printed material, it may actually take longer for the user to acquire (that is, pick up) the printed material in situations where the printing time is not long (for example, when printing a single sheet).

Aspects of non-limiting embodiments of the present disclosure relate to shortening the time until the user acquires printed material compared to the case where a printer that starts printing without involving an operation of giving a print instruction performed by a user on the printer is controlled such that the printed material is delivered without exception into a locked delivery unit that requires a key for retrieval of the printed material.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided a control apparatus including a processor configured to: execute a first control if a printing time is equal to or greater than a predetermined reference time, the printing time being for a case of using a printer to print on a basis of a print instruction received from a user terminal, the first control causing the printer to start printing before a user reaches the printer, and causing printed material to be delivered into a locked delivery unit that requires a key for retrieval of the printed material; and execute a second control if the printing time is less than the reference time, the second control causing the printer to start printing after the user reaches the printer, without involving an operation of giving a print instruction performed by the user on the printer, and causing the printed material to be delivered into a normal delivery unit that does not require a key for retrieval of the printed material.

BRIEF DESCRIPTION OF THE DRAWINGS

An exemplary embodiment of the present disclosure will be described in detail based on the following figures, wherein.

DETAILED DESCRIPTION

Hereinafter, an exemplary embodiment of the present disclosure will be described in detail on the basis of the drawings.

<Information Processing System 1>

Figure 1:
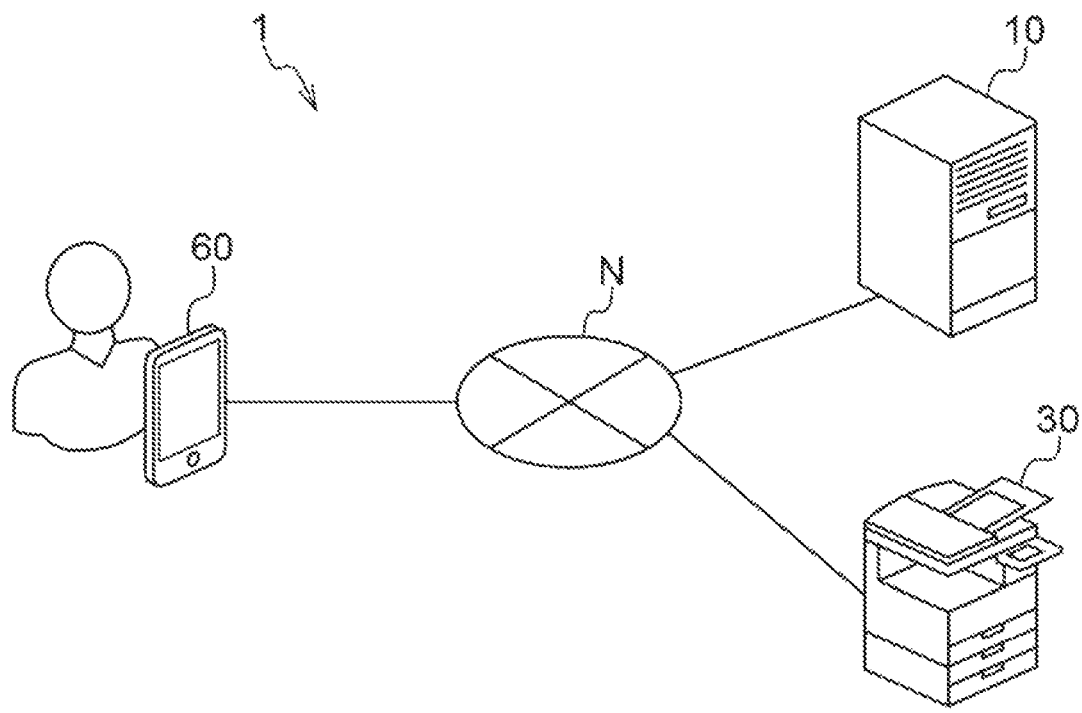
FIG. 1 is a schematic diagram illustrating an information processing system according to an exemplary embodiment.

First, an information processing system 1 according to the exemplary embodiment will be described. FIG. 1 is a schematic diagram illustrating the information processing system 1.

The information processing system 1 is a system that processes information, and as illustrated in FIG. 1, is provided with a multi-function device 30, a user terminal 60, and an information processing apparatus 10. The multi-function device 30, the user terminal 60, and the information processing apparatus 10 are interconnected through a wired or wireless communication channel N such as the Internet or an intranet. Hereinafter, specific configurations of the multi-function device 30, the user terminal 60, and the information processing apparatus 10 will be described.

<Multi-Function Device 30>

Figure 2:
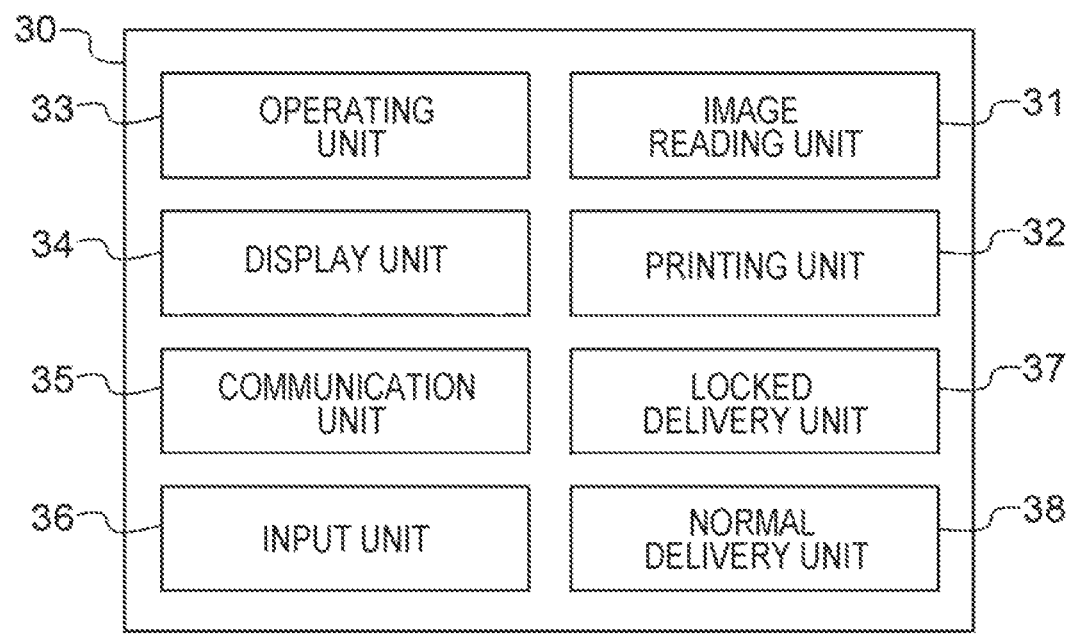
FIG. 2 is a block diagram illustrating an example of a hardware configuration of a multi-function device according to the exemplary embodiment.

FIG. 2 is a block diagram illustrating an example of a hardware configuration of the multi-function device 30. The multi-function device 30 illustrated in FIG. 2 is an example of a printer. The multi-function device 30 is a device that executes a print process, a scan process, a copy process, a facsimile process, and the like.

The print process is a process of printing (that is, forming an image) onto a recording medium. Thus, the print process may also be thought of as an image forming process. The scan process is a process of reading an image. The copy process is a process of forming an image read by the scan process onto a recording medium. The facsimile process is a process of converting an image into an electrical signal for transmission or reception. Note that an image may contain text.

Here, "printing" refers to forming an image, and as described later, "printing" encompasses not only the case of forming an image onto a recording medium according to an electrophotographic system, but also the case of forming an image onto a recording medium according to another system, such as an inkjet system. Moreover, in one example, the multi-function device 30 is installed in a facility such as a cashierless convenience store or other shop. An example of the facility is not limited to a commercial facility such as a store, and may also be a public facility (such as a city hall or a library).

Specifically, as illustrated in FIG. 2, the multi-function device 30 is provided with an image reading unit 31, a printing unit 32, an operating unit 33, a display unit 34, a communication unit 35, an input unit 36, a locked delivery unit 37, and a normal delivery unit 38.

The image reading unit 31 is a component (for example, a scanner) that reads an image of a document. The image reading unit 31 optically reads and converts an image of a document into an electrical signal, thereby generating image data.

The printing unit 32 is a component that prints (that is, a component that forms an image) onto a recording medium such as paper. The printing unit 32 prints according to an electrophotographic system in which the steps of charging, exposing, developing, transferring, and fusing are performed, for example. In the multi-function device 30, the recording medium on which printing has been performed (that is, printed material) is delivered into the locked delivery unit 37 or the normal delivery unit 38. Note that the printing unit 32 may also print into a recording medium according to another system, such as an inkjet system.

The locked delivery unit 37 is a delivery unit that requires a key for retrieval of printed material. The key refers to something that puts the locked delivery unit 37 into a state allowing retrieval of printed material delivered into the locked delivery unit 37, and the key encompasses a physical key and an electronic key. In the exemplary embodiment, an electronic key is used as an example of the key. An electronic key is configured as unlock information used to unlock the locked delivery unit 37. Examples of unlock information include a two-dimensional code, a barcode, and a passcode.

The input unit 36 is a component that accepts unlock information inputted by the user. In the case where the unlock information is a two-dimensional code or a barcode, the input unit 36 is configured as a reading apparatus that reads the two-dimensional code or barcode. In the case where the unlock information is a passcode, the input unit 36 is configured as an operating unit that is operated to input the passcode. In this case, the input unit 36 may be configured as an operating unit in common with the operating unit 33.

In the multi-function device 30, inputting the unlock information into the input unit 36 causes the locked delivery unit 37 to be unlocked, allowing retrieval of the printed material delivered into the locked delivery unit 37. Note that, as described later, the unlock information is transmitted to the user terminal 60 when the information processing apparatus 10 receives a print instruction. Consequently, in the case where the unlock information is a two-dimensional code or a barcode, for example, the user causes the user terminal 60 to display the transmitted unlock information and causes the input unit 36 to read the unlock information, thereby unlocking the locked delivery unit 37. In the case where the unlock information is a passcode, for example, the user causes the user terminal 60 to display the transmitted unlock information and then inputs the passcode into the input unit 36 while looking at the passcode, thereby unlocking the locked delivery unit 37.

The normal delivery unit 38 is a delivery unit that does not require a key for retrieval of printed material. Accordingly, not only the user who gave the print instruction but also a third party who did not give the print instruction is able to retrieve printed material from the normal delivery unit 38.

The operating unit 33 is a component that accepts input operations performed by a user. Specifically, the operating unit 33 is configured as input keys and a touch panel, for example.

The display unit 34 is a component that displays presentation information to be presented to the user. For example, the display unit 34 displays information pertaining to the processing content (for example, the type of processing and details of settings) of processing executed by the multi-function device 30 as the presentation information. Note that in one example, the display unit 34 includes a touch panel serving as the operating unit 33.

The communication unit 35 is a component for communicating with other equipment such as the information processing apparatus 10 and the user terminal 60. The communication unit 35 communicates with other equipment through the use of the wired or wireless communication channel N such as the Internet or an intranet. Note that although the communication unit 35 is provided in the multi-function device 30 in the exemplary embodiment, the multi-function device 30 may also be configured to be provided as a separate apparatus.

In the multi-function device 30, the print process is executed by causing the printing unit 32 to form an image onto a recording medium such as paper on the basis of print information (including image data). The multi-function device 30 is capable of executing a remote print process as the print process. In the remote print process, for example, the information processing apparatus 10 receives a print instruction from the user terminal 60, and the information processing apparatus 10 transmits print information (including image data) included in the print instruction to the multi-function device 30. The multi-function device 30 prints on the basis of the print information acquired from the information processing apparatus 10 through the communication unit 35, without involving an operation of giving a print instruction performed by the user on the operating unit 33. Note that the image data that the information processing apparatus 10 transmits to the multi-function device 30 is not limited to being image data transmitted from the user terminal 60, and may also be image data stored in advance in the information processing apparatus 10.

<User Terminal 60>

Figure 3:
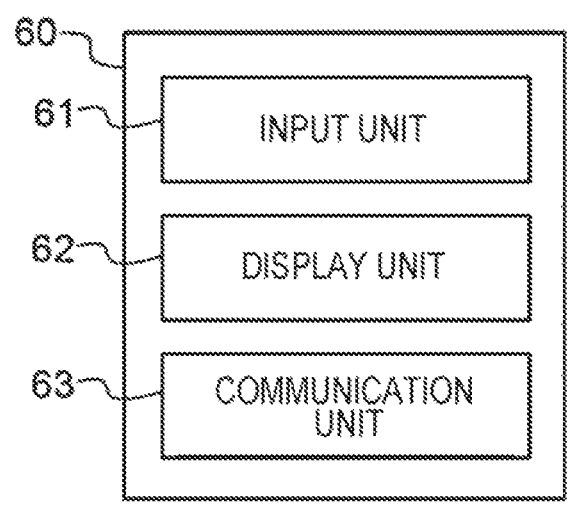
FIG. 3 is a block diagram illustrating an example of a hardware configuration of a user terminal according to the exemplary embodiment.

FIG. 3 is a block diagram illustrating an example of a hardware configuration of the user terminal 60 according to the exemplary embodiment. The user terminal 60 is a terminal such as a smartphone, tablet, or personal computer that can be carried by the user, for example. The user terminal 60 is provided with an input unit 61, a display unit 62, and a communication unit 63.

The input unit 61 is a component that accepts instructions inputted by the user. Specifically, the input unit 61 is configured as input keys and a touch panel on which the user performs input operations, for example.

The display unit 62 is a component that displays presentation information to be presented to the user. The display unit 62 displays unlock information as the presentation information, for example. Note that in one example, the display unit 62 is configured as a display that includes a touch panel serving as the input unit 61.

The communication unit 63 is a component for communicating with other equipment such as the information processing apparatus 10 and the multi-function device 30. The communication unit 63 communicates with other equipment through the use of the wired or wireless communication channel N such as the Internet or an intranet.

In the user terminal 60, a print instruction inputted by the user through the input unit 61 is transmittable to the information processing apparatus 10 through the communication unit 63.

The user terminal 60 has a built-in Global Positioning System (GPS) module and transmits location information about the user terminal 60, that is, location information about the user carrying the user terminal 60, to the information processing apparatus 10 through the communication unit 63.

<Information Processing Apparatus 10>

Figure 4:
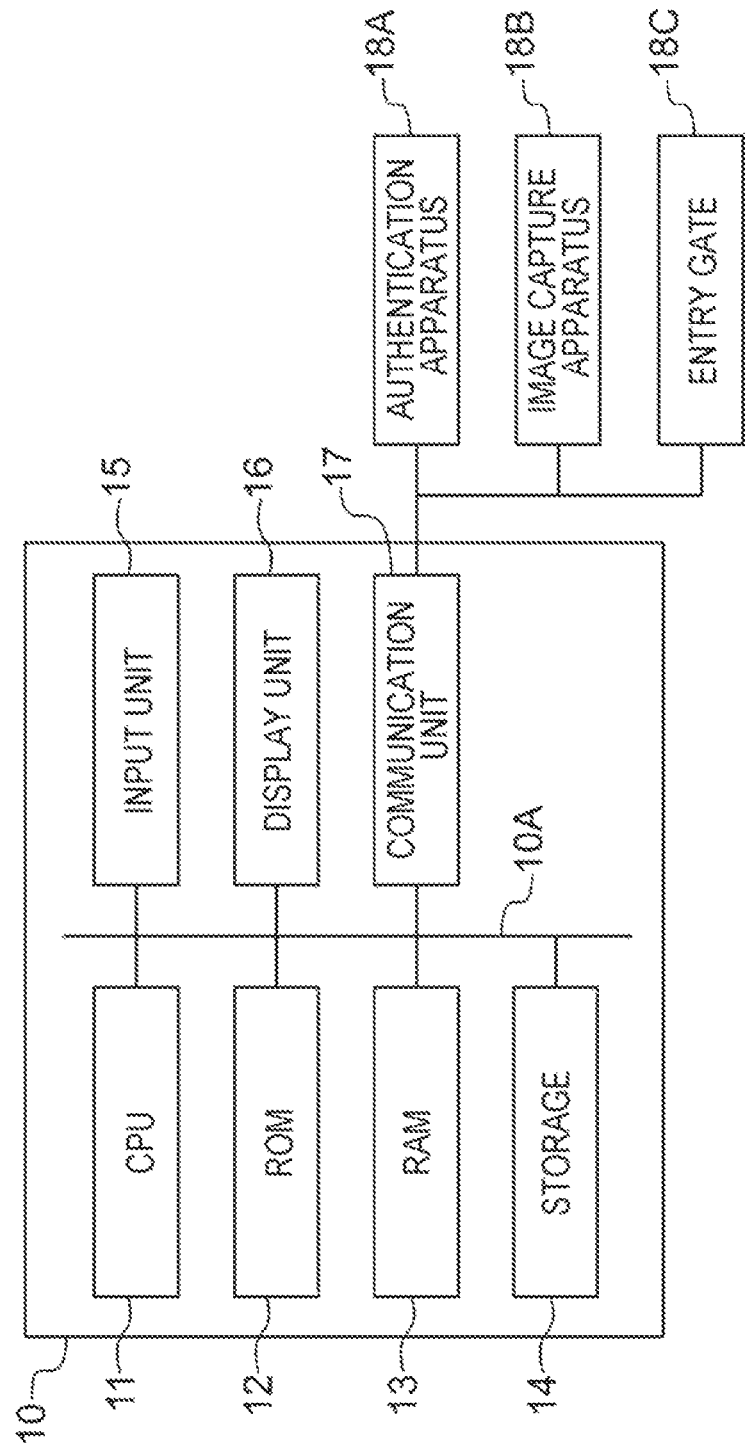
FIG. 4 is a block diagram illustrating an example of a hardware configuration of an information processing apparatus according to the exemplary embodiment.

FIG. 4 is a block diagram illustrating an example of a hardware configuration of the information processing apparatus 10 according to the exemplary embodiment. The information processing apparatus 10 illustrated in FIG. 4 is an example of a control apparatus, and is configured as a server apparatus installed in a facility such as a store, or in a headquarters that manages multiple facilities, for example. Note that an example of the control apparatus is not limited to the information processing apparatus 10, and may also be a control apparatus installed in or attached to the multi-function device 30, or any other apparatus capable of controlling the multi-function device 30.

The information processing apparatus 10 has the functions of a computer, and as illustrated in FIG. 4, is provided a central processing unit (CPU) 11, read-only memory (ROM) 12, random access memory (RAM) 13, storage 14, an input unit 15, a display unit 16, and a communication unit 17.

The CPU 11, ROM 12, RAM 13, storage 14, input unit 15, display unit 16, and communication unit 17 are interconnected by a bus 10A. Additionally, the information processing apparatus 10 is connected to an authentication apparatus 18A, an image capture apparatus 18B, and an entry gate 18C through the communication unit 17. The CPU 11 is an example of a processor.

The CPU 11 centrally controls the information processing apparatus 10 as a whole. The RAM 12 stores various programs, including a control program used in the exemplary embodiment, various data, and the like. The RAM 13 is memory used as a work area when the various programs are executed. The CPU 11 performs various processing by loading a program stored in the ROM 12 into the RAM 13 and executing the program. The control program is an example of an execution program.

The storage 14 is configured as a hard disk drive (HDD), a solid-state drive (SSD), or flash memory, for example, and stores various programs, various data, and the like. The storage 14 according to the exemplary embodiment stores a user identification database (DB) to be used when authenticating the user, for example. Note that the control program and the like may also be stored in the storage 14.

The input unit 15 is a component that accepts input operations performed by the user. Specifically, in one example, the input unit 15 is configured as a mouse and keyboard that accept text input and the like. In one example, the display unit 16 is configured as a display that displays images.

The communication unit 17 is a component for communicating with other equipment such as the multi-function device 30 and the user terminal 60. The communication unit 17 communicates with other equipment through the use of the wired or wireless communication channel N such as the Internet or an intranet.

<Authentication Apparatus 18A, Image Capture Apparatus 18B, and Entry Gate 18C>

The entry gate 18C is installed at an entrance to the facility, and is opened to allow the user to enter the facility. The opening and closing of the entry gate 18C are controlled by the information processing apparatus 10.

The authentication apparatus 18A is an apparatus for authenticating the user, and detects identification information that identifies the user. In one example, the authentication apparatus 18A is installed at the entrance to the facility. If the information processing apparatus 10 authenticates the user on the basis of identification information detected by the authentication apparatus 18A, the entry gate of the facility is opened and the user is allowed to enter.

The identification information is issued by registering the user in advance as a user of the facility, for example. Specific examples of the identification information include an identification image such as a two-dimensional code or a barcode. The user is authenticated by causing the user terminal 60 to display the identification image and causing the authentication apparatus 18A to read the displayed identification image.

User authentication may also be performed using an integrated circuit (IC) card or biometric authentication, for example. In this case, an apparatus that detects identification information contained in the IC card or identification information (such as a fingerprint, facial features, or a voiceprint) associated with biometric authentication information is used as the authentication apparatus 18A. The identification information detected by the authentication apparatus 18A is transmitted to the information processing apparatus 10.

The image capture apparatus 18B is an example of a detection apparatus. The image capture apparatus 18B is installed in the facility and includes a camera or the like that captures an image of a user inside the facility. Note that the image capture apparatus 18B may include multiple image capture apparatuses installed in the facility to capture images throughout the entire facility. The image capture apparatus 18B captures an image of a user entering the facility to thereby detect the user. Information pertaining to images captured by the image capture apparatus 18B (hereinafter referred to as captured image information) is transmitted to the information processing apparatus 10. The captured image information is an example of detection information.

<Functional Configuration of Information Processing Apparatus 10>

Figure 5:
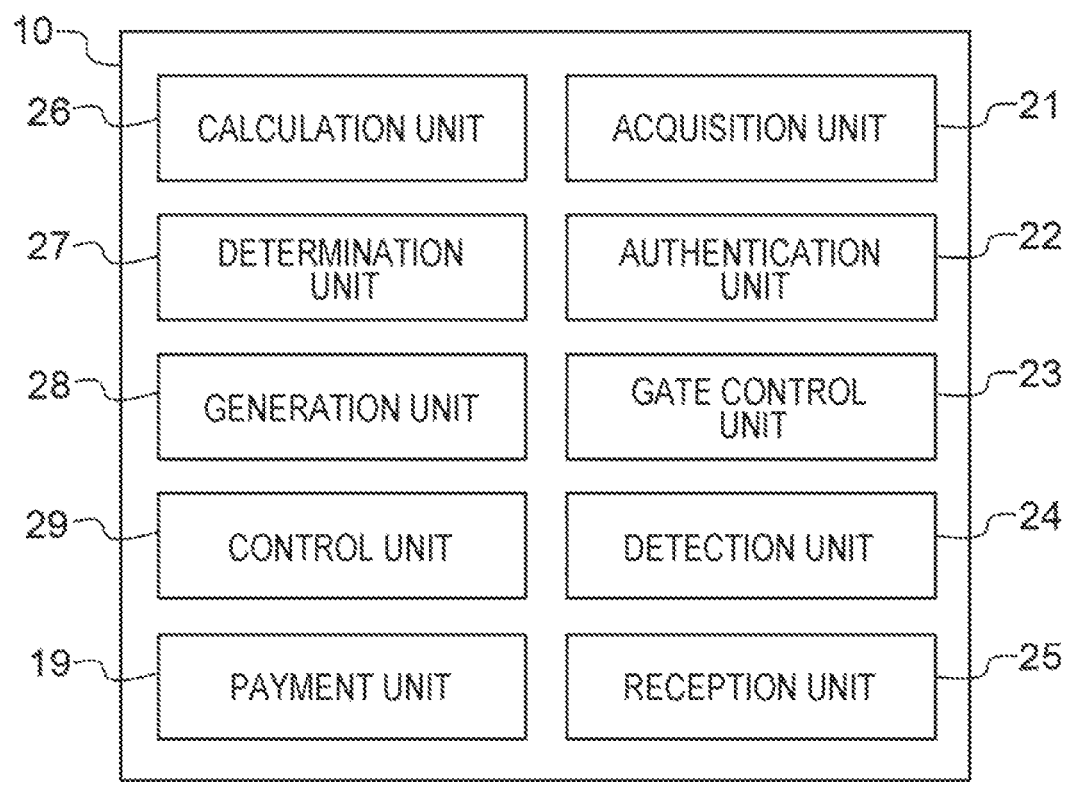
FIG. 5 is a block diagram illustrating an example of a functional configuration of the information processing apparatus according to the exemplary embodiment.

In the information processing apparatus 10, the CPU 11 executes the control program to thereby achieve various functions for controlling the multi-function device 30. Hereinafter, a functional configuration achieved through cooperation between the CPU 11 serving as a hardware resource and the control program serving as a software resource will be described. FIG. 5 is a block diagram illustrating an example of a functional configuration of the information processing apparatus 10 according to the exemplary embodiment.

In one example, as illustrated in FIG. 5, the information processing apparatus 10 is provided with an acquisition unit 21, an authentication unit 22, a gate control unit 23, a detection unit 24, a reception unit 25, a calculation unit 26, a determination unit 27, a generation unit 28, a control unit 29, and a payment unit 19.

The acquisition unit 21 acquires identification information from the authentication apparatus 18A. The acquisition unit 21 also acquires captured image information from the image capture apparatus 18B. The acquisition unit 21 acquires location information about the user located outside the facility from the user terminal 60. In one example, information obtained using the Global Positioning System (GPS) module built into the user terminal 60 is used as the location information about the user.

The authentication unit 22 compares the acquired identification information to user identification information registered in advance to identify and authenticate the user. The user identification information is stored in the storage 14, for example.

If the authentication unit 22 authenticates the user, the gate control unit 23 controls the entry gate so as to open the entrance.

The detection unit 24 detects the location of a user moving inside the facility by using the captured image information to track the user identified by the authentication unit 22 who has entered the facility from the entrance. Specifically, the detection unit 24 detects that the user has reached the multi-function device 30. That is, the detection unit 24 detects that the user has reached the location where the multi-function device 30 is installed (specifically, in front of the multi-function device 30). The detection unit 24 also detects that a user has exited the facility by detecting that the user has passed through an exit from the facility.

The reception unit 25 receives a print instruction from the user terminal 60. The print instruction includes print information such as image data, the number of pages to print, the paper size, a color setting (such as black and white printing or color printing, for example), and the image quality.

The calculation unit 26 calculates the printing time in the case of using the multi-function device 30 to print on the basis of the print instruction received from the user terminal 60. Specifically, the calculation unit 26 calculates the printing time on the basis of the print information included in the print instruction. The printing time increases in proportion to the greater the number of pages to print and the higher the image quality, for example.

The calculation unit 26 also calculates, from the location information about the user, an estimated arrival time when the user will reach the multi-function device 30. The estimated arrival time is calculated on the basis of user location information detected by the detection unit 24 after the user enters the facility. The estimated arrival time is also calculated on the basis of user location information acquired by the acquisition unit 21 before the user enters the facility. In one example, the calculation unit 26 obtains the distance from the location of the user to the multi-function device 30 on the basis of the user location information, and calculates the estimated arrival time from the obtained distance and a preset movement speed.

The determination unit 27 determines whether the calculated printing time is equal to or greater than a predetermined reference time. The reference time is set as a time that would be tolerable as a wait time for the user to wait in front of the multi-function device 30. For example the printing time for printing 1 to 3 pages (for example, 5 seconds) is set as the reference time.

If the printing time is equal to or greater than the reference time, the determination unit 27 determines whether it is possible to start printing before the user reaches the multi-function device 30. That is, if the printing time is equal to or greater than the reference time, the determination unit 27 determines whether it is possible to start printing before the estimated arrival time. Additionally, the determination unit 27 determines whether it is possible to complete printing before the estimated arrival time.

If the printing time is equal to or greater than the reference time, the generation unit 28 generates unlock information and transmits the unlock information to the user terminal 60.

The control unit 29 is a functional unit that controls operations by the multi-function device 30. If the printing time is equal to or greater than the reference time, the control unit 29 executes a first control that causes the multi-function device 30 to start printing before the user reaches the multi-function device 30, and causes the printed material to be delivered into the locked delivery unit 37.

Note that in the case of causing the multi-function device 30 to execute printing, the control unit 22 transmits print information to the multi-function device 30.

The control unit 29 executes, as the first control, a control that causes the multi-function device 30 to delay the start of printing and to complete the delivery of the printed material into the locked delivery unit 37 before the user reaches the multi-function device 30.

Specifically, for example, the control unit 29 delays the start of printing by the time difference between the printing time and the time from the current time until the estimated arrival time. For example, if the printing time is shorter than the estimated arrival time from when the user enters the facility until the user reaches the multi-function device 30, the control unit 29 may wait for the user to enter the facility and cause printing to be started on the basis of the entry of the user into the facility.

If the printing time is less than the reference time, the control unit 29 executes a second control that causes the multi-function device 30 to start printing after the user reaches the multi-function device 30, without involving an operation of giving a print instruction performed by the user on the multi-function device 30, and causes the printed material to be delivered into the normal delivery unit 38.

In the case of a non-executable state in which the printing time is equal to or greater than the reference time but the first control is not executable, instead of the first control, the control unit 29 executes a control that causes the multi-function device 30 to start printing after the user reaches the multi-function device 30, without involving an operation of giving a print instruction performed by the user on the multi-function device 30, and causes the printed material to be delivered into the normal delivery unit 38.

The case of the non-executable state refers to the case in which printing is not started before the user reaches the multi-function device 30. Specifically, for example, if the user is already at the installation location of the multi-function device 30 or close to the multi-function device 30, it may not be possible to start printing before the user reaches the multi-function device 30 in some cases. The case of the non-executable state refers to the case in which an empty locked delivery unit 37 does not exist, for example.

Note that the case of the non-executable state may also be the case in which the multi-function device 30 has run out of developer or recording medium.

The payment unit 19 automatically settles a fee for printed material if the user that has acquired printed material exits the facility.

<Control Processing According to Exemplary Embodiment>

Next, an example of control processing according to the exemplary embodiment will be described.

Figure 6:
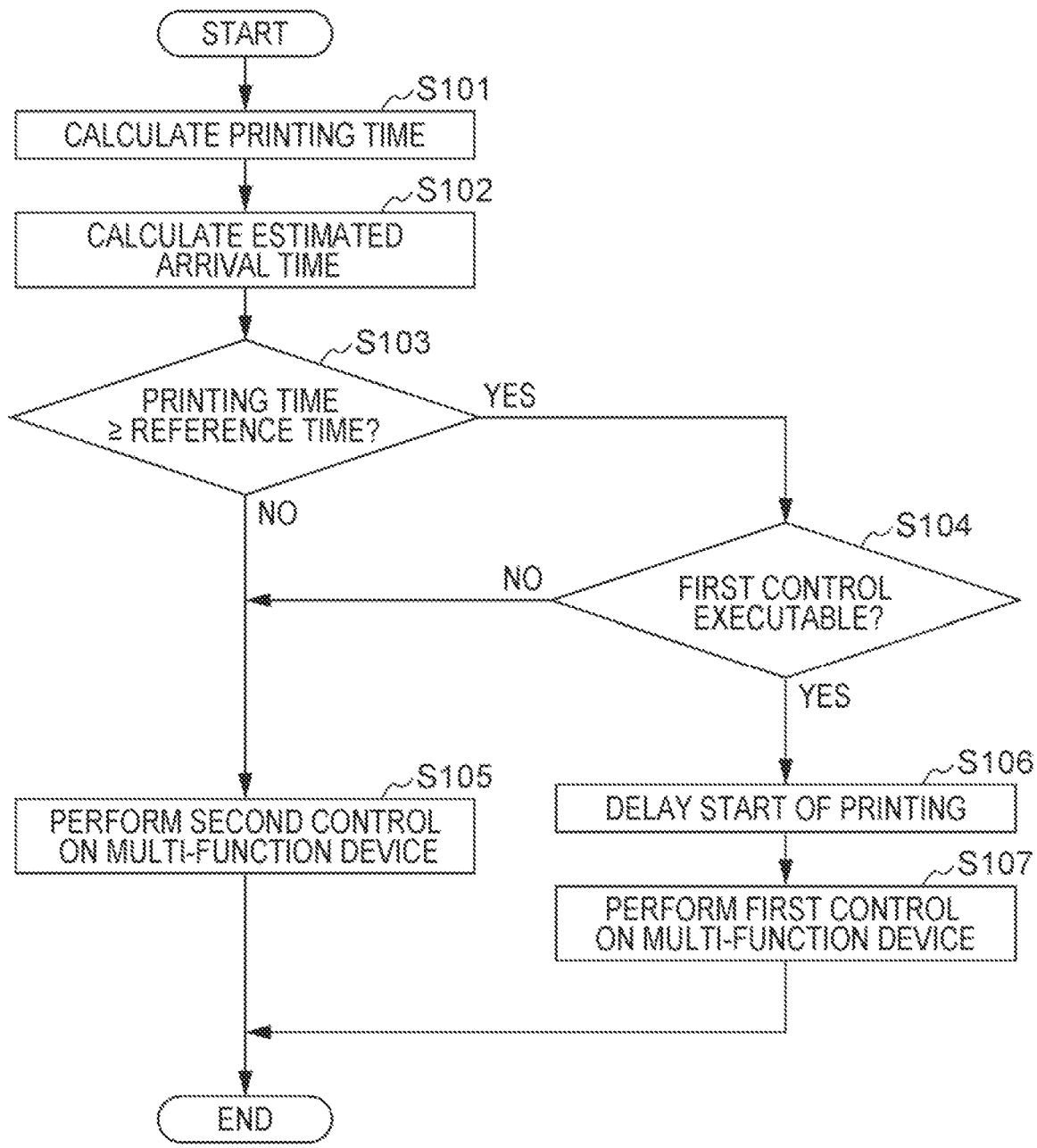
FIG. 6 is a flowchart illustrating an example of a flow of control processing executed by the information processing apparatus according to the exemplary embodiment.

FIG. 6 is a flowchart illustrating an example of a flow of control processing executed by the information processing apparatus 10.

In the exemplary embodiment, the control processing is executed by causing the CPU 11 to read out the control program from the ROM 12 or the storage 14 and execute the control program. In one example, execution of the control processing is initiated if the information processing apparatus 10 receives a print instruction from the user terminal 60.

As illustrated in FIG. 6, if the control processing is started, the CPU 11 calculates the printing time in the case of using the multi-function device 30 to print on the basis of a print instruction received from the user terminal 60 (step S101). The printing time is calculated on the basis of the print information included in the print instruction. The printing time increases in proportion to the greater the number of pages to print and the higher the image quality, for example.

Next, the CPU 11 calculates, from the location information about the user, the estimated arrival time when the user will reach the multi-function device 30 (step S102). After that the user enters the facility, the CPU 11 calculates the estimated arrival time on the basis of user location information detected from captured image information from the image capture apparatus 18B. Before the user enters the facility, the CPU 11 calculates the estimated arrival time on the basis of location information about the user obtained using the Global Positioning System (GPS) module built into the user terminal 60. In one example, the CPU 11 obtains the distance from the location of the user to the multi-function device 30 on the basis of the user location information, and calculates the estimated arrival time from the obtained distance and a preset movement speed.

Next, the CPU 11 determines whether the printing time is equal to or greater than a reference time (step S103). In the case of determining that the printing time is equal to or greater than the reference time (step S103: YES), the CPU 11 determines whether it is possible to execute the first control that causes the multi-function device 30 to start printing before the user reaches the multi-function device 30, and causes the printed material to be delivered into the locked delivery unit 37 (step S104).

In the case of determining the non-executable state in which the first control is not executable with respect to the multi-function device 30 (step S104: NO) and in the case of determining that the printing time is less than the reference time (step S103: NO), the CPU 11 executes the second control that causes the multi-function device 30 to start printing after the user reaches the multi-function device 30, without involving an operation of giving a print instruction performed by the user on the multi-function device 30, and causes the printed material to be delivered into the normal delivery unit 38 (S105), after which the control processing ends.

In the case of determining that the first control is executable with respect to the multi-function device 30 (step S104: YES), the CPU 11 delays the start of printing (step S106). Specifically, for example, the CPU 11 delays the start of printing by the time difference between the printing time and the time from the current time until the estimated arrival time. As another example, if the printing time is shorter than the estimated arrival time from when the user enters the facility until the user reaches the multi-function device 30, the control unit 29 may delay the start of printing until the user enters the facility. In this case, the CPU 11 causes printing to be started on the basis of the entry of the user into the facility, for example. Note that a configuration that causes printing to be started on the basis of the entry of the user into the facility encompasses the case where printing is started at the timing when the user enters and the case where printing is started after a preset time elapses with respect to the timing when the user enters.

Next, the CPU 11 executes the first control that causes the multi-function device 30 to start printing before the user reaches the multi-function device 30, and causes the printed material to be delivered into the locked delivery unit 37 (step S107), after which the control processing ends. Specifically, in step S107, the CPU 11 executes, as the first control, a control that causes the multi-function device 30 to complete the delivery of the printed material into the locked delivery unit 37 before the user reaches the multi-function device 30.

As a result of the information processing apparatus 10 executing the control processing as above, if the printing time in the case of using the multi-function device 30 to print on the basis of a print instruction received from the user terminal 60 is equal to or greater than the predetermined reference time, the multi-function device 30 starts printing before the user reaches the multi-function device 30 and delivers the printed material into the locked delivery unit 37, whereas if the printing time is less than the reference time, the multi-function device 30 starts printing after the user reaches the multi-function device 30, without involving an operation of giving a print instruction performed by the user on the multi-function device 30, and delivers the printed material into the normal delivery unit 38.

<Action According to Exemplary Embodiment>

Next, the action according to exemplary embodiment will be described.

According to the exemplary embodiment, if the printing time is equal to or greater than the reference time, the CPU 11 executes the first control that causes the multi-function device 30 to start printing before the user reaches the multi-function device 30, and causes the printed material to be delivered into the locked delivery unit 37.

On the other hand, if the printing time is less than the reference time, the CPU 11 executes the second control that causes the multi-function device 30 to start printing after the user reaches the multi-function device 30, without involving an operation of giving a print instruction performed by the user on the multi-function device 30, and causes the printed material to be delivered into the normal delivery unit 38.

In the case of executing a control with respect to the multi-function device 30 that starts printing without involving an operation of giving a print instruction performed by the user on the operating unit 33 of the multi-function device 30, the control causing the multi-function device 30 to deliver printed material into the locked delivery unit 37 without exception (hereinafter referred to as Mode A), since printing is started before the user reaches the multi-function device 30, the wait time until the printing is completed may be shortened, but on the other hand, since the locked delivery unit 37 is required to be unlocked to retrieve printed material, it may actually take longer for the user to acquire (that is, pick up) the printed material in the case where the printing time is less than the reference time.

In the exemplary embodiment, if the printing time is less than the reference time, the second control is executed, the second control causing the multi-function device 30 to start printing after the user reaches the multi-function device 30, without involving an operation of giving a print instruction performed by the user on the multi-function device 30, and causing the printed material to be delivered into the normal delivery unit 38; thus, the time until the user acquires the printed material may be shortened compared to Mode A.

Also, in the exemplary embodiment, the CPU 11 executes, as the first control, a control that causes the multi-function device 30 to complete the delivery of the printed material into the locked delivery unit 37 before the user reaches the multi-function device 30. Accordingly, the time until the user acquires the printed material may be shortened compared to the case where the CPU 11 executes a control that causes the multi-function device 30 to complete the delivery of the printed material into the locked delivery unit 37 after the user reaches the multi-function device 30.

Also, in the exemplary embodiment, the CPU 11 executes, as the first control, a control that causes the multi-function device 30 to delay the start of printing and to complete the delivery of the printed material into the locked delivery unit 37 before the user reaches the multi-function device 30.

Accordingly, the time until the printed material is acquired by the user after being delivered into the locked delivery unit 37 may be shortened compared to the case where the CPU 11 executes a control that causes the multi-function device 30 not to delay the start of printing and to complete the delivery of the printed material into the locked delivery unit 37 before the user reaches the multi-function device 30. That is, the time during which the printed material is contained in the locked delivery unit 37, or in other words the time during which the printed material could possibly be retrieved by a third party, may be shortened.

In the case of the non-executable state in which the printing time is equal to or greater than the reference time but the first control is not executable, instead of the first control, the CPU 11 executes a control that causes the multi-function device 30 to start printing after the user reaches the multi-function device 30, without involving an operation of giving a print instruction performed by the user on the multi-function device 30, and causes the printed material to be delivered into the normal delivery unit 38.

Accordingly, a situation in which the user is unable to acquire the printed material may be avoided compared to the case where the CPU 11 does not cause the multi-function device 30 to execute printing in the non-executable state in which the printing time is equal to or greater than the reference time but the first control is not executable.

In the exemplary embodiment, the case of the non-executable state refers to the case in which printing is not started before the user reaches the multi-function device 30, for example. That is, in the case in which the printing time is equal to or greater than the reference time but printing is not started before the user reaches the multi-function device 30, the CPU 11 executes a control that causes the multi-function device 30 to start printing after the user reaches the multi-function device 30, without involving an operation of giving a print instruction performed by the user on the multi-function device 30, and causes the printed material to be delivered into the normal delivery unit 38.

Accordingly, the time until the user acquires the printed material may be shortened compared to the case where, if the printing time is equal to or greater than a predetermined reference time but printing is not started before the user reaches the multi-function device 30, the CPU 11 executes a control that causes the multi-function device 30 to deliver the printed material into the locked delivery unit 37 after the user reaches the multi-function device 30.

Also, in the exemplary embodiment, the case of the non-executable state refers to the case in which an empty locked delivery unit 37 does not exist, for example. That is, in the case in which the printing time is equal to or greater than the reference time but an empty locked delivery unit 37 does not exist, the CPU 11 executes a control that causes the multi-function device 30 to start printing after the user reaches the multi-function device 30, without involving an operation of giving a print instruction performed by the user on the multi-function device 30, and causes the printed material to be delivered into the normal delivery unit 38.

Accordingly, the time until the user acquires the printed material may be shortened compared to the case where, if the printing time is equal to or greater than a predetermined reference time but an empty locked delivery unit 37 does not exist, the CPU 11 does not start printing until an empty locked delivery unit 37 is available.

The CPU 11 detects the arrival of the user on the basis of captured image information acquired from the image capture apparatus 18B provided in the facility.

Accordingly, the precision of detecting the arrival of the user may be raised compared to the case where the CPU 11 detects the arrival of the user on the basis of detection information acquired from only a detection apparatus provided to the multi-function device 30.

The CPU 11 automatically settles a fee for printed material if the user that has acquired printed material exits the facility.

Accordingly, a situation in which the user has to perform a laborious operation for payment processing may be avoided compared to the case where the CPU 11 performs payment processing on the basis of an input operation on the multi-function device 30.

<Exemplary Modifications of Information Processing Apparatus 10>

In the exemplary embodiment, the CPU 11 executes, as the first control, a control that causes the multi-function device 30 to complete the delivery of the printed material into the locked delivery unit 37 before the user reaches the multi-function device 30, but is not limited to the above. For example, the CPU 11 may also execute a control that causes the multi-function device 30 to complete the delivery of printed material into the locked delivery unit 37 after the user reaches the multi-function device 30.

Also, in the exemplary embodiment, the CPU 11 executes, as the first control, a control that causes the multi-function device 30 to delay the start of printing and to complete the delivery of the printed material into the locked delivery unit 37 before the user reaches the multi-function device 30, but is not limited to the above. For example, the CPU 11 may also execute a control that causes the multi-function device 30 not to delay the start of printing and to complete the delivery of printed material into the locked delivery unit 37 before the user reaches the multi-function device 30.

Also, in the exemplary embodiment, in the case of the non-executable state in which the printing time is equal to or greater than the reference time but the first control is not executable, instead of the first control, the CPU 11 executes a control that causes the multi-function device 30 to start printing after the user reaches the multi-function device 30, without involving an operation of giving a print instruction performed by the user on the multi-function device 30, and causes the printed material to be delivered into the normal delivery unit 38, but is not limited to the above. For example, the CPU 11 may also be configured not to cause the multi-function device 30 to execute printing in the non-executable state in which the printing time is equal to or greater than the reference time but the first control is not executable.

Also, in the exemplary embodiment, in the case in which the printing time is equal to or greater than the reference time but printing is not started before the user reaches the multi-function device 30, the CPU 11 executes a control that causes the multi-function device 30 to start printing after the user reaches the multi-function device 30, without involving an operation of giving a print instruction performed by the user on the multi-function device 30, and causes the printed material to be delivered into the normal delivery unit 38, but is not limited to the above. For example, if the printing time is equal to or greater than a predetermined reference time but printing is not started before the user reaches the multi-function device 30, the CPU 11 may execute a control that causes the multi-function device 30 to deliver the printed material into the locked delivery unit 37.

Also, in the exemplary embodiment, in the case in which the printing time is equal to or greater than the reference time but an empty locked delivery unit 37 does not exist, the CPU 11 executes a control that causes the multi-function device 30 to start printing after the user reaches the multi-function device 30, without involving an operation of giving a print instruction performed by the user on the multi-function device 30, and causes the printed material to be delivered into the normal delivery unit 38, but is not limited to the above. For example, if the printing time is equal to or greater than a predetermined reference time but an empty locked delivery unit 37 does not exist, the CPU 11 may be configured not to start printing until an empty locked delivery unit 37 is available.

In the exemplary embodiment, the CPU 11 detects the arrival of the user on the basis of captured image information acquired from the image capture apparatus 18B provided in the facility, but is not limited to the above. For example, the CPU 11 may detect the arrival of the user on the basis of detection information acquired from a detection apparatus provided to the multi-function device 30 instead of, or in addition to, the captured image information acquired from the image capture apparatus 18B provided in the facility.

In the exemplary embodiment, the CPU 11 automatically settles a fee for printed material if the user that has acquired printed material exits the facility, but is not limited to the above. For example, the CPU 11 may also be configured to perform payment processing on the basis of an input operation on the multi-function device 30.

Also, in the exemplary embodiment, the CPU 11 may also execute, as the first control, a control that causes the multi-function device 30 to start printing on the basis of the entry of the user into the facility, and causes the printed material to be delivered into the locked delivery unit 37.

According to the above configuration, the time until the printed material is acquired by the user after being delivered into the locked delivery unit 37 may be shortened compared to the case where the CPU 11 executes a control that causes the multi-function device 30 to start printing before the user enters the facility, and causes the printed material to be delivered into the locked delivery unit 37. That is, the time during which the printed material is contained in the locked delivery unit 37, or in other words the time during which the printed material could possibly be retrieved by a third party, may be shortened.

Also, in the exemplary embodiment, the CPU 11 may also execute, as the first control, a control that causes the multi-function device 30 to start printing on the basis of the entry of the user into the facility, and to complete the delivery of the printed material into the locked delivery unit 37 before the user reaches the multi-function device 30.

According to the above configuration, the time until the user acquires the printed material may be shortened compared to the case where the CPU 11 executes a control that causes the multi-function device 30 to start printing on the basis of the entry of the user into the facility, and to complete the delivery of the printed material into the locked delivery unit 37 after the user reaches the multi-function device 30.

The present disclosure is not limited to the exemplary embodiment above, and various modifications, alterations, and improvements are possible without deviating from the gist of the present disclosure. For example, the exemplary modifications described above may also be plurally combined, as appropriate.

In the embodiments above, the term "processor" refers to hardware in a broad sense. Examples of the processor include general processors (e.g., CPU: Central Processing Unit), and dedicated processors (e.g., GPU: Graphics Processing Unit, ASIC: Application Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the exemplary embodiment above, and may be changed.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

(Appendix)

(((1)))

A control apparatus comprising:
a processor configured to:
execute a first control if a printing time is equal to or greater than a predetermined reference time, the printing time being for a case of using a printer to print on a basis of a print instruction received from a user terminal, the first control causing the printer to start printing before a user reaches the printer, and causing printed material to be delivered into a locked delivery unit that requires a key for retrieval of the printed material; and
execute a second control if the printing time is less than the reference time, the second control causing the printer to start printing after the user reaches the printer, without involving an operation of giving a print instruction performed by the user on the printer, and causing the printed material to be delivered into a normal delivery unit that does not require a key for retrieval of the printed material.

(((2)))

The control apparatus according to (((1))), wherein the processor is configured to execute, as the first control, a control that causes the printer to complete delivery of the printed material into the locked delivery unit after the user reaches the printer.

(((3)))

The control apparatus according to (((2))), wherein the processor is configured to execute, as the first control, a control that causes the printer to delay a start of printing and to complete delivery of the printed material into the locked delivery unit before the user reaches the printer.

(((4)))

The control apparatus according to any one of (((1))) to (((3))), wherein:
the printer is installed in a facility; and the processor is configured to execute, as the first control, a control that causes the printer to start printing on a basis of an entry of the user into the facility, and causes the printed material to be delivered into the locked delivery unit.

(((5)))

The control apparatus according to (((4))), wherein the processor is configured to execute, as the first control, a control that causes the printer to start printing on a basis of the entry of the user into the facility, and to complete delivery of the printed material into the locked delivery unit before the user reaches the printer.

(((6)))

The control apparatus according to any one of (((1))) to (((5))), wherein:
in a case of a non-executable state in which the printing time is equal to or greater than a predetermined reference time but the first control is not executable, the processor is configured to execute, instead of the first control, a control causing the printer to start printing after the user reaches the multi-function device, without involving an operation of giving a print instruction performed by the user on the printer, and causing the printed material to be delivered into the normal delivery unit.

(((7)))

The control apparatus according to (((6))), wherein the case of the non-executable state is a case in which printing is not started before the user reaches the printer.

(((8)))

The control apparatus according to (((6))), wherein the case of the non-executable state is a case in which an empty locked delivery unit does not exist.

(((9)))

The control apparatus according to any one of (((1))) to (((8))), wherein:
the printer is installed in a facility; and
the processor is configured to detect an arrival of the user on a basis of detection information acquired from a detection apparatus provided in the facility.

(((10)))

The control apparatus according to any one of (((1))) to (((9))), wherein:
the printer is installed in a facility; and
the processor is configured to automatically settle a fee for the printed material if the user that has acquired the printed material exits the facility.

(((11)))

A program causing a computer to execute a process comprising:
executing a first control if a printing time is equal to or greater than a predetermined reference time, the printing time being for a case of using a printer to print on a basis of a print instruction received from a user terminal, the first control causing the printer to start printing before a user reaches the printer, and causing printed material to be delivered into a locked delivery unit that requires a key for retrieval of the printed material; and
executing a second control if the printing time is less than the reference time, the second control causing the printer to start printing after the user reaches the printer, without involving an operation of giving a print instruction performed by the user on the printer, and causing the printed material to be delivered into a normal delivery unit that does not require a key for retrieval of the printed material.

(((12)))

A printer wherein:
if a printing time is equal to or greater than a predetermined reference time, the printing time being for a case of using the printer to print on a basis of a print instruction received from a user terminal, the printer starts printing before a user reaches the printer and delivers printed material into a locked delivery unit that requires a key for retrieval of the printed material; and
if the printing time is less than the reference time, the printer starts printing after the user reaches the printer, without involving an operation of giving a print instruction performed by the user on the printer, and delivers the printed material into a normal delivery unit that does not require a key for retrieval of the printed material.

What is claimed is:

1. A control apparatus comprising:
a processor configured to:
execute a first control if a printing time is equal to or greater than a predetermined reference time, the printing time being for a case of using a printer to print on a basis of a print instruction received from a user terminal, the first control causing the printer to start printing before a user reaches the printer, and causing printed material to be delivered into a locked delivery unit that requires a key for retrieval of the printed material; and
execute a second control if the printing time is less than the reference time, the second control causing the printer to start printing after the user reaches the printer, without involving an operation of giving a print instruction performed by the user on the printer, and causing the printed material to be delivered into a normal delivery unit that does not require a key for retrieval of the printed material.

2. The control apparatus according to claim 1, wherein the processor is configured to execute, as the first control, a control that causes the printer to complete delivery of the printed material into the locked delivery unit after the user reaches the printer.

3. The control apparatus according to claim 2, wherein the processor is configured to execute, as the first control, a control that causes the printer to delay a start of printing and to complete delivery of the printed material into the locked delivery unit before the user reaches the printer.

4. The control apparatus according to claim 1, wherein:
the printer is installed in a facility; and
the processor is configured to execute, as the first control, a control that causes the printer to start printing on a basis of an entry of the user into the facility, and causes the printed material to be delivered into the locked delivery unit.

5. The control apparatus according to claim 4, wherein the processor is configured to execute, as the first control, a control that causes the printer to start printing on a basis of the entry of the user into the facility, and to complete delivery of the printed material into the locked delivery unit before the user reaches the printer.

6. The control apparatus according to claim 1, wherein:
in a case of a non-executable state in which the printing time is equal to or greater than a predetermined reference time but the first control is not executable,
the processor is configured to execute, instead of the first control, a control causing the printer to start printing after the user reaches the multi-function device, without involving an operation of giving a print instruction performed by the user on the printer, and causing the printed material to be delivered into the normal delivery unit.

7. The control apparatus according to claim 6, wherein the case of the non-executable state is a case in which printing is not started before the user reaches the printer.

8. The control apparatus according to claim 6, wherein the case of the non-executable state is a case in which an empty locked delivery unit does not exist.

9. The control apparatus according to claim 1, wherein the printer is installed in a facility, and
the processor is configured to detect an arrival of the user on a basis of detection information acquired from a detection apparatus provided in the facility.

10. The control apparatus according to claim 1, wherein:
the printer is installed in a facility; and
the processor is configured to automatically settle a fee for the printed material if the user that has acquired the printed material exits the facility.

11. A non-transitory computer readable medium storing a program causing a computer to execute a process comprising:
executing a first control if a printing time is equal to or greater than a predetermined reference time, the printing time being for a case of using a printer to print on a basis of a print instruction received from a user terminal, the first control causing the printer to start printing before a user reaches the printer, and causing printed material to be delivered into a locked delivery unit that requires a key for retrieval of the printed material; and
executing a second control if the printing time is less than the reference time, the second control causing the printer to start printing after the user reaches the printer, without involving an operation of giving a print instruction performed by the user on the printer, and causing the printed material to be delivered into a normal delivery unit that does not require a key for retrieval of the printed material.

12. A printer wherein:
if a printing time is equal to or greater than a predetermined reference time, the printing time being for a case of using the printer to print on a basis of a print instruction received from a user terminal, the printer starts printing before a user reaches the printer and delivers printed material into a locked delivery unit that requires a key for retrieval of the printed material; and
if the printing time is less than the reference time, the printer starts printing after the user reaches the printer, without involving an operation of giving a print instruction performed by the user on the printer, and delivers the printed material into a normal delivery unit that does not require a key for retrieval of the printed material.

* * * * *